(12) United States Patent
Tsukio (10) Patent No.: US 11,105,290 B2
(45) Date of Patent: Aug. 31, 2021

(54) ELECTRONIC CONTROL DEVICE

(71) Applicant: HITACHI AUTOMOTIVE SYSTEMS, LTD., Hitachinaka (JP)

(72) Inventor: Koichi Tsukio, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 51 days.

(21) Appl. No.: 16/614,767

(22) PCT Filed: May 8, 2018

(86) PCT No.: PCT/JP2018/017696
§ 371 (c)(1),
(2) Date: Nov. 18, 2019

(87) PCT Pub. No.: WO2019/003643
PCT Pub. Date: Jan. 3, 2019

(65) Prior Publication Data
US 2020/0173389 A1      Jun. 4, 2020

(30) Foreign Application Priority Data

Jun. 30, 2017  (JP) .............................. JP2017-128763

(51) Int. Cl.
*F02D 41/20* (2006.01)
*F02M 51/06* (2006.01)

(52) U.S. Cl.
CPC ............. *F02D 41/20* (2013.01); *F02M 51/06* (2013.01); *F02D 2041/2003* (2013.01); *F02D 2041/2051* (2013.01)

(58) Field of Classification Search
CPC ............ F02D 41/20; F02D 2041/2003; F02D 2041/2051; F02D 41/40; F02D 2041/2044; F02D 2041/2048; F02D 2041/2058; F02M 51/06
See application file for complete search history.

(56) References Cited

U.S. PATENT DOCUMENTS

| 7,784,445 B2 * | 8/2010 | Takahashi | ............... F02D 41/20 |
| | | | 123/479 |
| 10,197,002 B2 * | 2/2019 | Tanaka | ................. F02M 51/061 |

(Continued)

FOREIGN PATENT DOCUMENTS

| JP | H11-082128 A | 3/1999 |
| JP | H11-107882 A | 4/1999 |

(Continued)

OTHER PUBLICATIONS

International Search Report dated Sep. 4, 2018 for the PCT International Application No. PCT/JP2018/017696.

*Primary Examiner* — Logan M Kraft
*Assistant Examiner* — Susan E Scharpf
(74) *Attorney, Agent, or Firm* — Volpe Koenig (57) ABSTRACT

Provided is an electronic control device capable of always achieving a desired injector injection amount by preventing a change in injector opening time regardless of a change (a decrease) of a power supply voltage for opening a valve of an injector. A precharge current amount at the time of precharge control is changed in a stepwise manner based on a voltage of the injector valve open power supply device 10 at the time of the precharge control.

7 Claims, 6 Drawing Sheets

(56) References Cited

U.S. PATENT DOCUMENTS

| | | | | |
|---|---|---|---|---|
| 2003/0165039 | A1* | 9/2003 | Moran | F02D 41/20 361/160 |
| 2008/0289607 | A1* | 11/2008 | Mayuzumi | F02D 41/20 123/490 |
| 2009/0071443 | A1* | 3/2009 | Miyake | F02D 41/20 123/446 |
| 2009/0177367 | A1* | 7/2009 | Toyohara | F02D 41/20 701/103 |
| 2009/0177369 | A1* | 7/2009 | Miyake | F02D 41/20 701/105 |
| 2010/0193036 | A1* | 8/2010 | Haggenmiller | F02D 41/20 137/1 |
| 2017/0226950 | A1* | 8/2017 | Tanaka | F02D 41/20 |
| 2018/0010546 | A1* | 1/2018 | Niwa | F02M 45/00 |
| 2018/0112618 | A1* | 4/2018 | Yanoto | F02D 41/30 |

FOREIGN PATENT DOCUMENTS

| | | |
|---|---|---|
| JP | H11-315745 A | 11/1999 |
| JP | 2016-037870 A | 3/2016 |
| JP | 2017-020478 A | 1/2017 |
| WO | 2013/191267 A1 | 12/2013 |

* cited by examiner

ELECTRONIC CONTROL DEVICE

TECHNICAL FIELD

The present invention relates to an electronic control device, and particularly to an electronic control device that controls a fuel injection valve that injects and supplies fuel to an internal combustion engine.

BACKGROUND ART a control system of a fuel injection valve (hereinafter, referred to as an injector) by an internal combustion engine, a technology (precharge control) is known in which a preliminary energizing current (also referred to as a precharge current) is allowed to flow before a valve open current is allowed to flow to the injector (see PTLs 1 and 2).

For example, PTL 1 discloses a technique of applying a precharge current to a load before starting control and applying an increased voltage at a start time of control in a method for load control such as an electromagnetic valve that controls fuel adjustment of an internal combustion engine.

In addition, for example, PTL 2 discloses a fuel injection control device of an internal combustion engine, which supplies a precharge current that is smaller than a current for actuating a valve body to an electromagnetic unit of a fuel injection valve in a precharge period at a beginning of energization during fuel injection, and supplies a drive current to actuate the valve body subsequently. In the fuel injection control device, a current change parameter which is a parameter in correlation with a speed of a rising change of the drive current is acquired, and the supply of the precharge current to the electromagnetic unit of the fuel injection valve is controlled based on the obtained current change parameter.

PRIOR ART LITERATURE

Patent Literature

PTL 1: JP-A-H11-315745
PTL 2: JP-A-2016-37870

SUMMARY OF INVENTION

Technical Problem

However, in the related art disclosed in PTL 1, precharge control is performed at a constant precharge current amount regardless of a power supply voltage for opening the injector. Accordingly, there is a problem that valve open time of the injector changes due to the power supply voltage.

In the related art disclosed in PTL 2, a precharge current amount is determined in accordance with the obtained current change parameter which is a parameter correlated with a speed of a rising change of the drive current, and accordingly the reflection of the precharge current amount for precharge control is delayed by one injection. In addition, similarly to PTL 1, when the precharge current amount is determined, a power supply voltage that is a source of a valve open current of the injector is not taken into consideration. Accordingly, valve open time of the injector changes when a difference occurs between a power supply voltage at a time of acquiring the current change parameter and the power supply voltage at a time of actually reflecting the precharge current amount.

The invention is made in view of the above circumstances and an object of the invention is to provide an electronic control device capable of always achieving a desired injector injection amount by preventing a change in injector opening time regardless of a change (a decrease) of a power supply voltage for opening a valve of an injector.

Solution to Problem

To achieve the above object, an electronic control device according to the invention supplies, to a fuel injection valve, a current for opening the fuel injection valve based on a voltage supplied by a power supply device and performs precharge control of supplying a current to the fuel injection valve before the current supply is performed. The precharge control is performed based on a voltage of the power supply device when the precharge control is performed.

Advantageous Effect

According to the invention, it is possible to provide an electronic control device capable of always achieving a desired injector injection amount by preventing a change in injector opening time regardless of a change (a decrease) of a power supply voltage which is a source of a valve open current of a fuel injection valve (an injector).

Problems, configurations, and effects other than the above ones will be apparent from the following description of embodiments.

DESCRIPTION OF EMBODIMENTS

Hereinafter, embodiments of an electronic control device according to the invention will be described below with reference to the drawings. In the drawings, the same reference numerals denote the same parts.

First Embodiment

Figure 1:
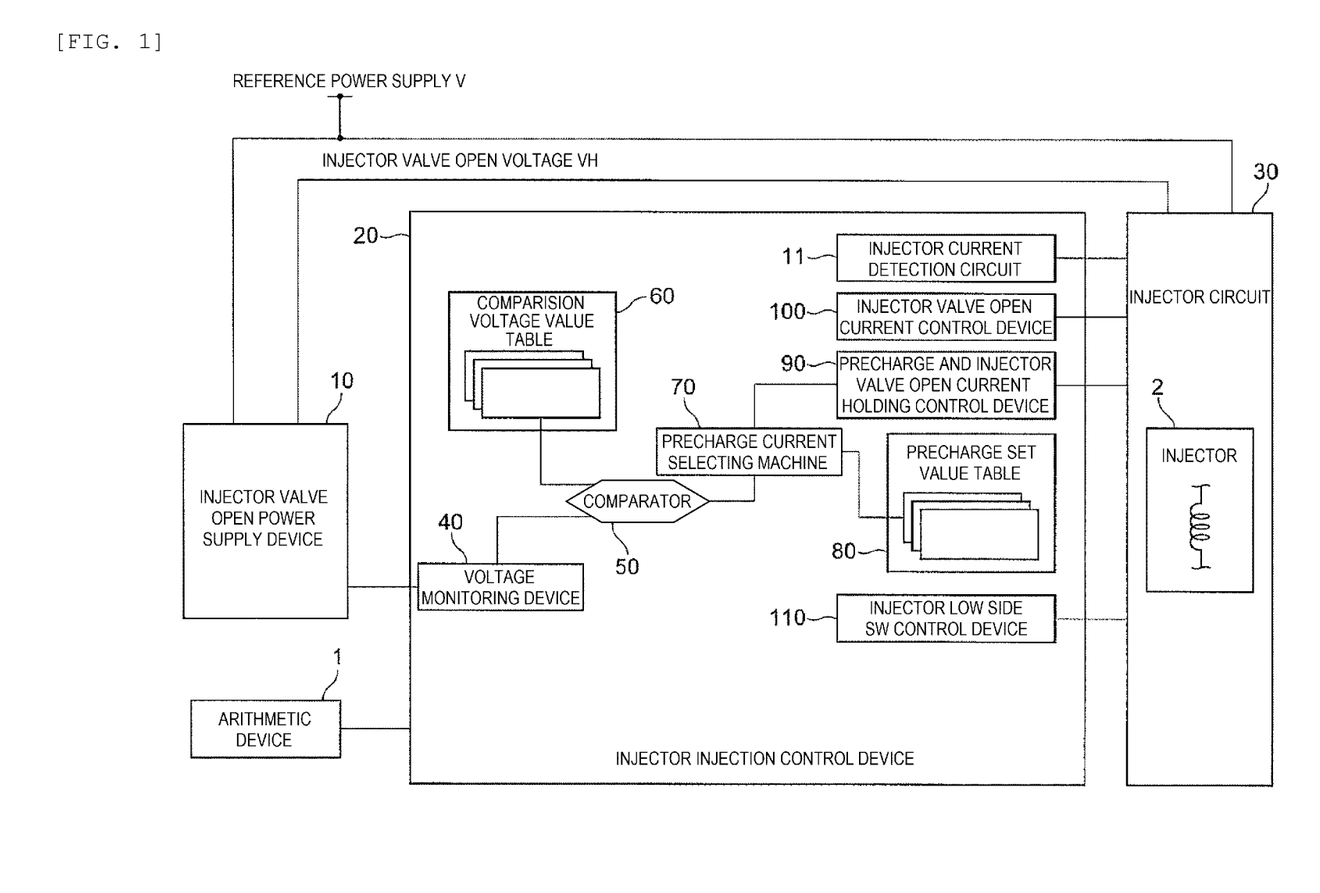
FIG. 1 is a circuit configuration diagram according to a first embodiment of an electronic control device according to the invention.
Figure 2:
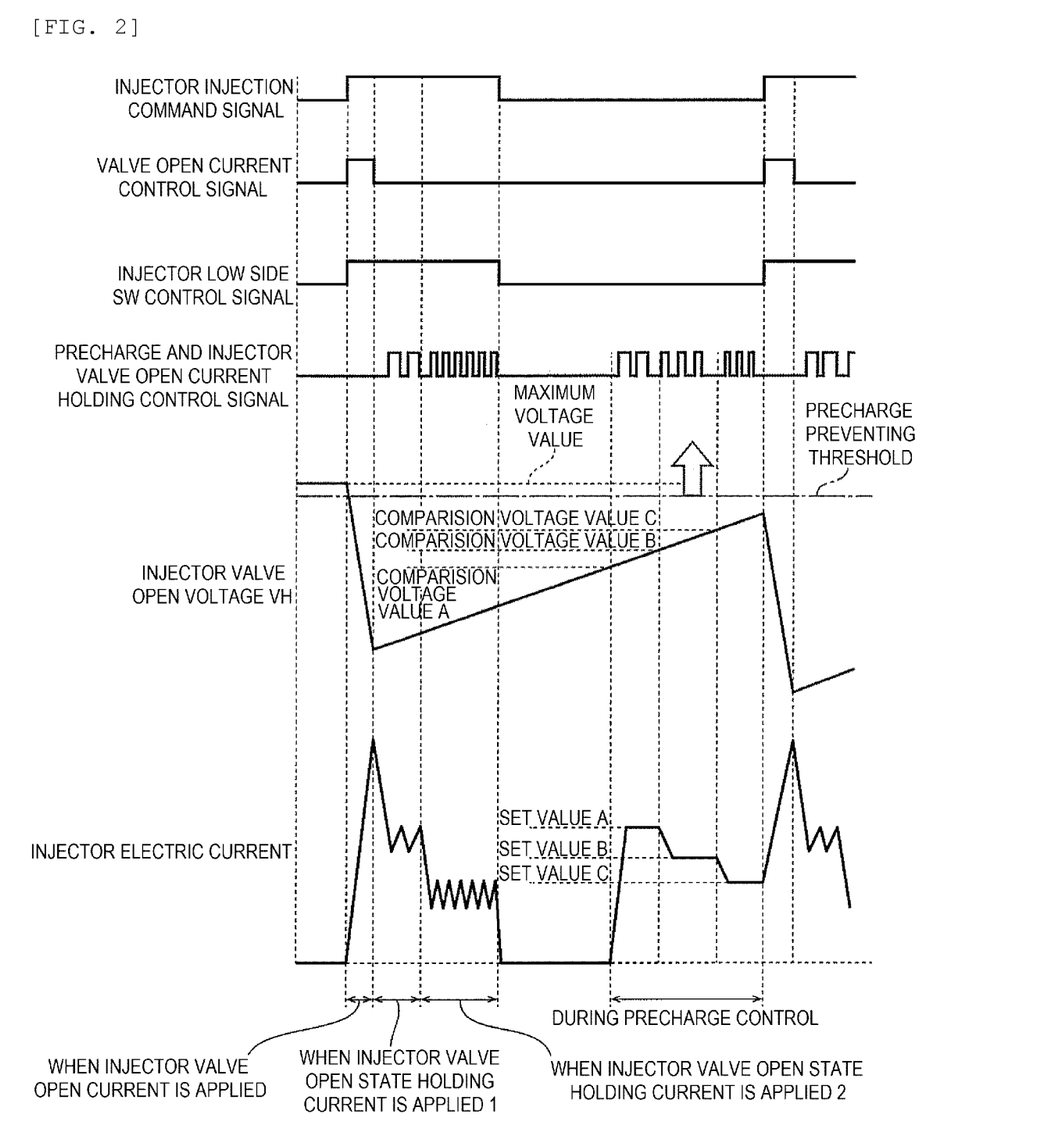
FIG. 2 is a timing chart according to the first embodiment of the electronic control device according to the invention.

FIG. 1 is a circuit configuration diagram according to a first embodiment of an injector injection control device as the electronic control device according to the invention and FIG. 2 is a timing chart when the first embodiment is implemented.

An injector injection control device (the electronic control device) 20 according to the illustrated embodiment controls current supply to an injector 2 that injects and supplies fuel into a cylinder of an internal combustion engine and controls a driving state of the injector 2. For example, the injector injection control device 20 may be constituted by a microcomputer including a CPU, a ROM, a RAM, an I/O, a timer, and the like.

When an injector injection command signal is input from an arithmetic device 1 to the injector injection control device 20, the injector injection control device 20 outputs, to an injector circuit 30 that controls the driving state of the injector 2, a valve open current control signal for opening a valve of the injector 2 from an injector valve open current control device 100, an injector low side SW control signal from an injector low side SW control device 110, and a precharge and injector valve open current holding control signal from a precharge and injector valve open current holding control device 90, respectively. The valve open current control signal mentioned here is a signal for controlling a current application to open the valve of the injector 2, the injector low side SW control signal mentioned here is a signal for controlling a low side SW to allow a current to flow to the injector 2, and the precharge and injector valve open current holding control signal is a signal for controlling a current application to maintain the precharge and an valve open state of the injector 2 for a certain period.

An injector valve open voltage VH that allows an injector valve open current to flow is generated in the injector valve open power supply device 10 and is supplied to the injector circuit 30. In the present embodiment, the injector valve open voltage VH that allows the injector valve open current to flow is supplied from a reference power supply V to the injector valve open power supply device 10 and is generated by a booster circuit inside the injector valve open power supply device 10, and the injector valve open voltage VH is supplied to the injector circuit 30. However, it is also conceivable that the injector valve open voltage VH is supplied from a power supply prepared in advance. In addition, in a power supply that applies current to hold the precharge and the valve open state of the injector 2 for a certain period, the reference power supply V is directly supplied to the injector circuit 30 in the present embodiment. However, it is also conceivable to supply the reference power supply V from the injector valve open power supply device 10 or other power supplies.

A current flowing to the injector 2 in the injector circuit 30 is monitored by an injector current detection circuit 11 provided in the injector injection control device 20, so that the current flowing to the injector 2 is controlled based on the current detected by the injector current detection circuit 11.

In the present embodiment, the injector circuit 30 is driven by monitoring the valve open current control signal, the injector low side SW control signal, the precharge and injector valve open current holding control signal, and the current flowing to the injector 2.

In the present embodiment, in addition to the injector valve open current control device 100, the injector low side SW control device 110, the precharge and injector valve open current holding control device 90, and the injector current detection circuit 11, the injector injection control device 20 also includes a voltage monitoring device 40 that monitors a voltage of the injector valve open power supply device 10 that opens the valve of the injector 2, a comparison voltage value table 60 to change a precharge current amount during precharge control according to a voltage value, a comparator 50 to compare the voltage of the injector valve open power supply device 10 obtained from the power supply monitoring device 40 and a comparison voltage value set by the comparison voltage value table 60, a precharge set value table 80 to determine (a set value of) the precharge current amount during precharge control according to the voltage value, and a precharge current selecting machine 70 that selects (a set value of) the precharge current amount from the precharge set value table 80 according to information obtained from the comparator 50. The precharge control is performed by transmitting (the set value of) the precharge current amount in the precharge set value table 80 selected by the precharge current selecting machine 70 to the precharge and injector valve open current holding control device 90 and is based on the voltage of the injector valve open power supply device 10 obtained from the power supply monitoring device 40.

More specifically, the voltage monitoring device 40 monitors the voltage of the injector valve open power supply device 10, and transmits the voltage (the injector valve open voltage VH) to the comparator 50. In the comparator 50, the injector valve open voltage VH transmitted to the comparator 50 is compared with a plurality of comparison voltage values preset in the comparison voltage value table 60. When any one of the comparison voltage values in the comparison voltage value table 60 is reached, the comparator 50 transmits information (a fact that the injector valve open voltage VH reaches the comparison voltage values in the comparison voltage value table 60) to the precharge current selecting machine 70. In the present embodiment, the comparison voltage value table 60 used by the comparator 50 is assumed to be a comparison voltage value table having a plurality of predetermined comparison voltage values. However, the comparison voltage values may also be obtained by calculation or be controlled by reflecting a correction value to the comparison voltage values of the comparison voltage value table 60. In addition, the comparison voltage values in the comparison voltage value table 60 may be set in a principle (that is, in a relationship in which another comparison voltage value is determined if a certain comparison voltage value is determined) or be set individually (in other words, randomly).

The precharge current selecting machine 70 acquires the set value of the precharge current amount (the set value corresponding to the injector valve open voltage VH transmitted to the comparator 50) from the preset precharge set value table 80, in which a plurality of set values of the precharge current amount are preset, corresponding to the information communicated from the comparator 50, and transmits the set value to the precharge and injector valve open current holding control device 90. In the present embodiment, the precharge set value table 80 used by the precharge current selecting machine 70 is assumed to be a precharge set value table having a plurality of set values of a predetermined precharge current amount. However, the set values may also be obtained by calculation or be controlled by reflecting a correction value to the set values of the precharge set value table 80. In addition, similarly to the comparison voltage value table 60, the respective set values in the precharge set value table 80 may be set in a principle (that is, in a relationship in which another set value is determined if a certain set value is determined) or be set individually (in other words, randomly). In addition, in the present embodiment, a timing of reflecting the precharge current amount for the injector valve open voltage VH is reflected to the precharge current amount immediately after the injector valve open voltage VH is detected by the voltage monitoring device 40. However, the timing of reflecting the precharge current amount may also be controlled in variation.

The precharge and injector valve open current holding control device 90 generates the precharge and injector valve open current holding control signal corresponding to the information transmitted from the precharge current selecting machine 70, and outputs the signal to the injector circuit 30. By doing so, it is possible to vary the precharge current amount during precharge control based on the injector valve open voltage VH. In the example shown in FIG. 2, three set values of the comparison voltage value and the precharge current amount are set in a stepwise manner, and the precharge current amount at the time of the precharge control is set (in a multistage manner) to decrease sequentially (in a stepwise manner) as the injector valve open voltage VH (the voltage of the injector valve open power supply device 10) recovers (increases).

Further, in the present embodiment, there may be a case where precharge is not necessary when the injector valve open voltage VH is close to a maximum value of a voltage that can be applied by the injector valve open power supply device 10. Accordingly, a precharge preventing threshold value is provided in the comparison voltage value table 60 and the precharge set value table 80, so that the precharge control is prevented when the injector valve open voltage VH is equal to or larger than the precharge preventing threshold value. The precharge preventing threshold value may be constant or variable.

As described above, in the present embodiment, the injector valve open voltage VH obtained by the voltage monitoring device 40 and the comparison voltage values set in the comparison voltage value table 60 are compared with each other by the comparator 50, and the precharge current selecting machine 70 selects an appropriate (set value of) precharge current amount from the precharge set value table 80 based on a result obtained by the comparator 50. By doing so, the set value of the precharge current amount can be switched in accordance with the injector valve open voltage VH during precharge control. Accordingly, the precharge control can be performed in accordance with a decreased voltage even when the injector valve open voltage VH decreases due to the opening of the injector 2, and thus a valve of the injector 2 can always be opened at the same speed as that in the case where the injector valve open voltage VH is the maximum voltage value. Therefore, it is possible to always implement a constant injector injection amount.

Second Embodiment

Figure 3:
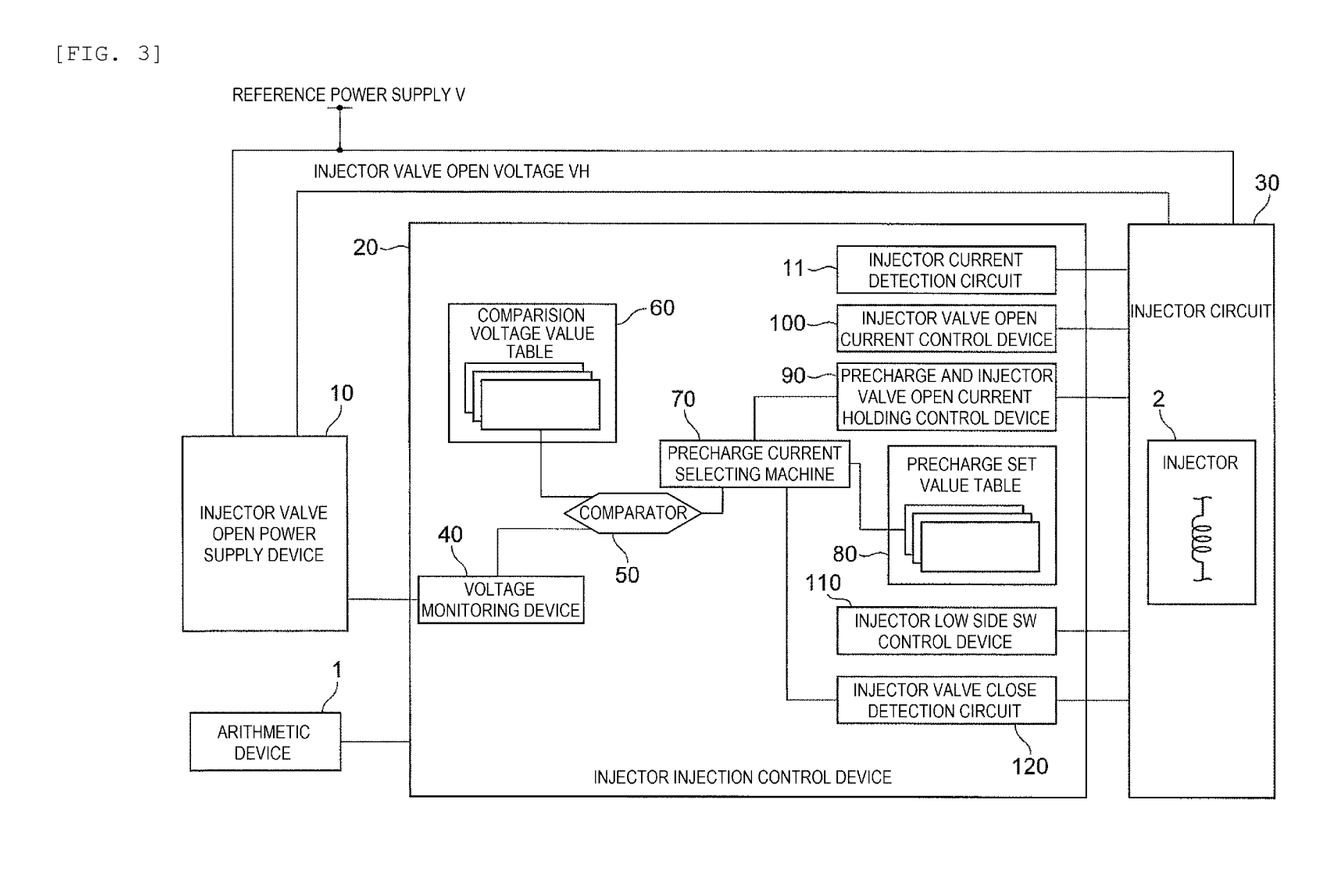
FIG. 3 is a circuit configuration diagram according to a second embodiment of the electronic control device according to the invention.
Figure 4:
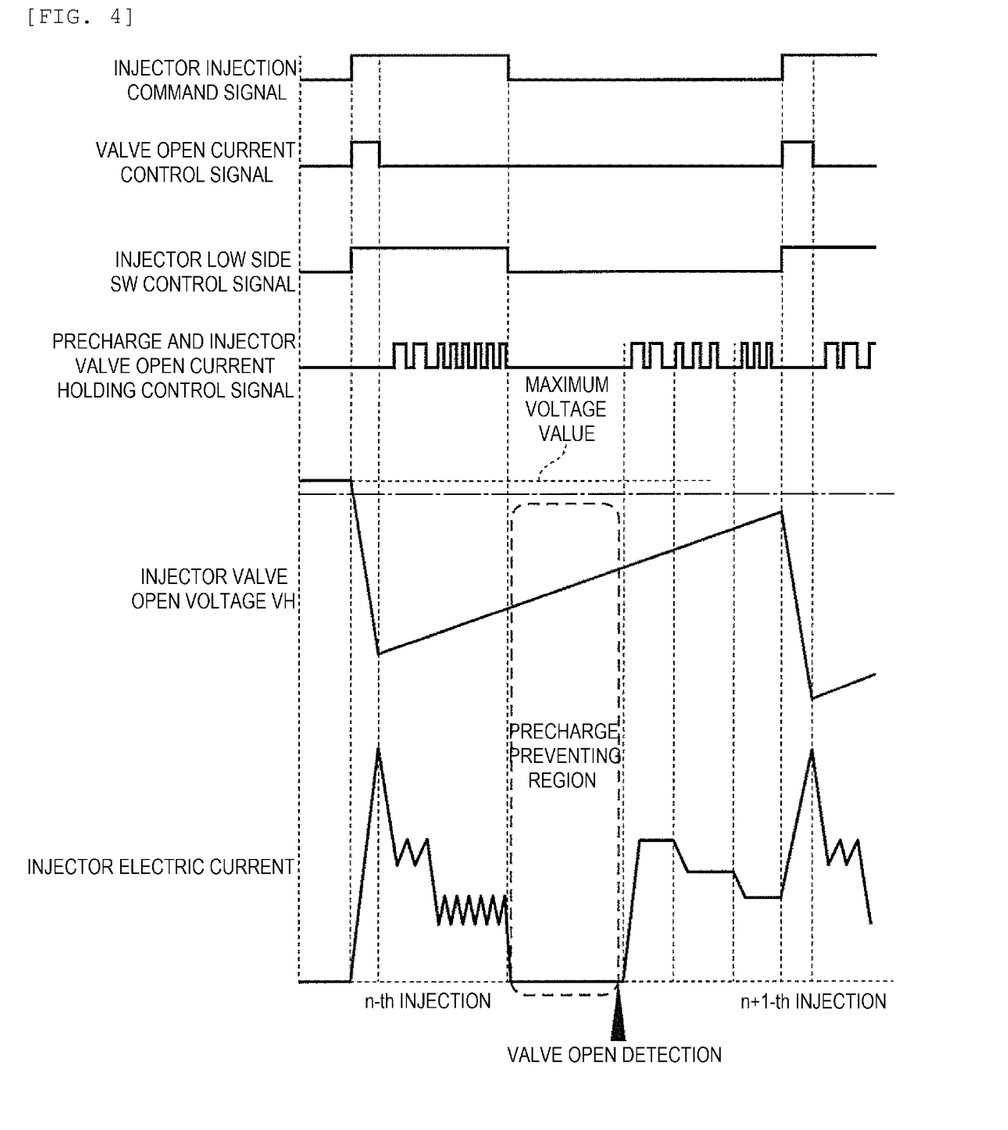
FIG. 4 is a timing chart according to the second embodiment of the electronic control device according to the invention.

FIG. 3 is a circuit configuration diagram according to a second embodiment of the injector injection control device as the electronic control device according to the invention and FIG. 4 is a timing chart when the second embodiment is implemented.

In a circuit configuration of the second embodiment, an injector valve close detection circuit 120 is added to the circuit configuration of the first embodiment shown in FIG. 1 and other parts of the configuration are substantially the same as the circuit configuration of the first embodiment.

The injector valve close detection circuit 120 is a circuit to detect that a valve of the injector 2 in the injector circuit 30 is closed. Valve close information of the injector 2 detected by the injector valve close detection circuit 120 is transmitted to the precharge current selecting machine 70.

When injection of the injector 2 is performed equal to or more than twice in succession, it is considered that the valve of the injector 2 cannot be closed even after an injector injection command by energizing the injector 2 with precharge control, since precharge control to open a valve of the next injector 2 is performed immediately after the injector injection command. Therefore, in the present embodiment, the precharge current selecting machine 70 prevents next precharge control until the valve close information of the injector 2 is transmitted to the precharge current selecting machine 70 after the injector injection command by the injector injection command signal input from the arithmetic device 1 to the injector injection control device 20 is ended (that is, after the current holding control of opening the valve of the injector 2 and holding the valve open).

As described above, in the present embodiment, in addition to the first embodiment described above, it is possible to reliably prevent the valve of the injector 2 from being closed by the precharge control by providing a precharge preventing region (see FIG. 4) based on the valve close information and the injector injection information according to the injector valve close detection circuit 120.

Third Embodiment

Figure 5:
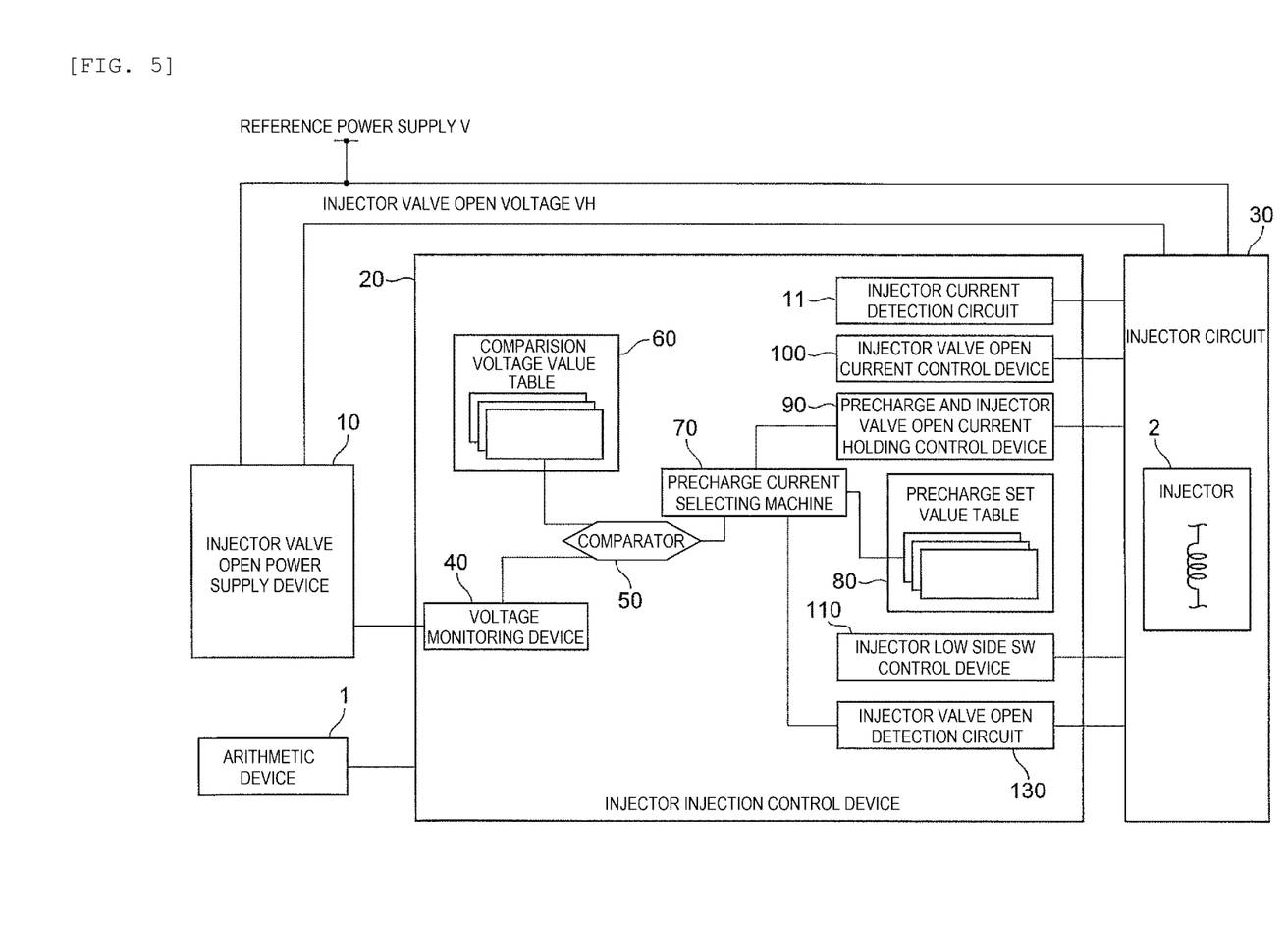
FIG. 5 is a circuit configuration diagram according to a third embodiment of the electronic control device according to the invention.
Figure 6:
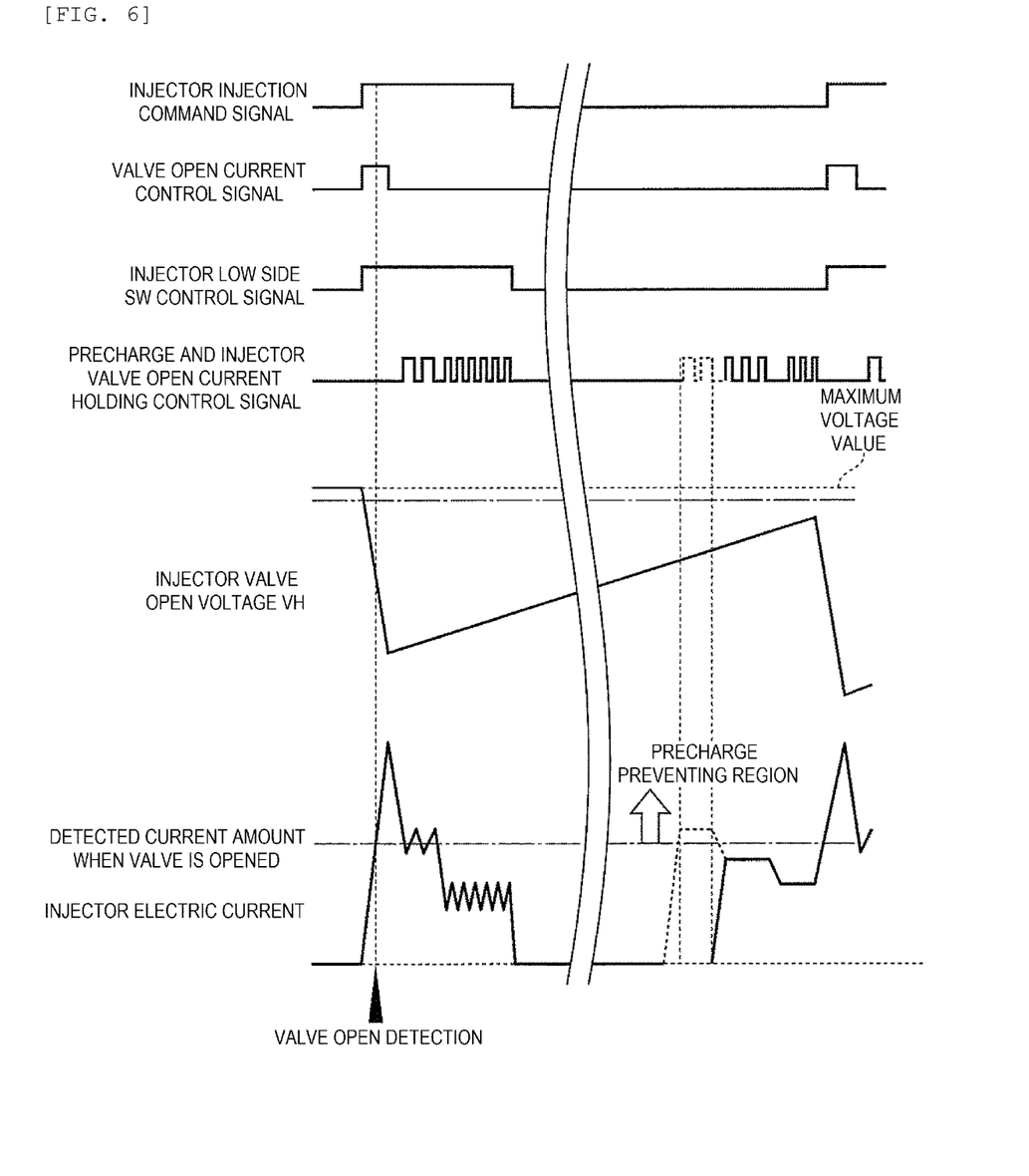
FIG. 6 is a timing chart according to the third embodiment of the electronic control device according to the invention.

FIG. 5 is a circuit configuration diagram according to a third embodiment of the injector injection control device as the electronic control device according to the invention and FIG. 6 is a timing chart when the third embodiment is implemented.

In a circuit configuration of the third embodiment, an injector valve open detection circuit 130 is added to the circuit configuration of the first embodiment shown in FIG. 1 and other parts of the configuration are substantially the same as the circuit configuration of the first embodiment.

The injector valve open detection circuit 130 is a circuit to detect that a valve of the injector 2 in the injector circuit 30 is open. Valve open information of the injector 2 detected by the injector valve open detection circuit 130 is transmitted to the precharge current selecting machine 70.

When a control current at a time of precharge control is a current capable of opening the valve of the injector 2, there is a possibility that the valve of the injector 2 is opened during the precharge control and fuel is injected from the injector 2 inadvertently. Therefore, in the present embodiment, a current flowing through the injector 2 can be known when the valve of the injector 2 is opened based on an injector energizing current detected by the injector current detection circuit 11 and the valve open information according to the injector valve open detection circuit 130. Accordingly, the precharge current selecting machine 70 holds a current amount that flows when the valve of the injector 2 is opened (a current amount detected when the valve is opened), and prevents precharge control at a current amount equal to or larger than the current amount (the current amount detected when the valve is opened) in a next and subsequent precharge control.

As described above, in the present embodiment, in addition to the first embodiment described above, it is possible to reliably prevent fuel injection due to inadvertent injector valve opening by the precharge control by providing a precharge preventing region (see FIG. 6) based on the current amount when the valve of the injector is opened that is obtained by using the injector valve open detection circuit 130 (see FIG. 6).

When the injector valve open detection circuit 130 detects that the valve of the injector 2 is opened by the precharge control, the current amount (the precharge current amount when the valve is opened) at this time is held. In the next and subsequent precharge control, precharge control at a current amount equal to or larger than the current amount (the precharge current amount when the valve is opened) can be prevented.

The invention is not limited to the embodiments described above and includes various modifications. For example, the embodiments described above are described in detail for easy understanding of the invention and the invention is not necessarily limited to an embodiment including all the configurations described above. In addition, a part of the configuration of a certain embodiment can be replaced with the configuration of another embodiment and the configuration of another embodiment can be added to the configuration of the certain embodiment. It is possible to add, delete, and replace other configurations for a part of the configuration of each embodiment.

A part or all of the above described configurations, functions, processing units, processing methods, and the like may be realized by hardware, for example, by designing an integrated circuit. In addition, the above-described configurations, functions, and the like may also be implemented by software by interpreting and executing programs that implement respective functions by a processor. Information such as a program, a table, and a file that implements each function can be stored in a storage device such as a memory, a hard disk, a Solid State Drive (SSD), or in a recording medium such as an IC card, an SD card, or a DVD.

Control lines and information lines are considered to be necessary for explanation and not all control lines and information lines necessary for a product are shown. It may be considered that almost all the configurations are actually connected to each other.

REFERENCE SIGN LIST 1 arithmetic device
2 fuel injection valve (injector)
10 injector valve open power supply device
11 injector current detection circuit
20 injector injection control device (electronic control device)
30 injector circuit
40 voltage monitoring device
50 comparator
60 comparison voltage value table
70 precharge current selecting machine
80 precharge set value table
90 precharge and injector valve open current holding control device
100 injector valve open current control device
110 injector low side SW control device
120 injector valve close detection circuit
130 injector valve open detection circuit

The invention claimed is:

1. An electronic control device powered by a voltage that supplies, to a fuel injection valve, a current for opening the fuel injection valve based on the voltage, comprising a precharge control configured to supply a precharge current to the fuel injection valve before the current supply is performed,
wherein a precharge current amount is based on the voltage; and
wherein
when the voltage is equal to or more than a predetermined precharge preventing threshold value, the precharge control is prevented.

2. The electronic control device according to claim 1, further comprising:
a comparator having a plurality of predetermined comparison voltage values, wherein the precharge current amount is based on a comparison of said plurality of predetermined comparison voltage values and the voltage and a set value of the precharge current amount is selected from a plurality of set values of predetermined precharge current amount and corresponding to the comparison voltage value.

3. The electronic control device according to claim 2, wherein
the plurality of comparison voltage values can be set individually.

4. The electronic control device according to claim 2, wherein
the plurality of set values of the precharge current amount can be set individually.

5. The electronic control device according to claim 1, wherein
the precharge preventing threshold value may be set as a variable.

6. An electronic control device powered by a voltage that supplies, to a fuel injection valve, a current for opening the fuel injection valve based on the voltage comprising a precharge control configured to supply a precharge current to the fuel injection valve before the current supply is performed,
wherein
a valve open detection current amount when the fuel injection valve is detected to be opened is held, and
in a next and subsequent precharge control, precharge control at a precharge current amount equal to or larger than the valve open detection current amount is prevented.

7. An electronic control device powered by a voltage that supplies, to a fuel injection valve, a current for opening the fuel injection valve based on the voltage comprising a precharge control configured to supply a precharge current to the fuel injection valve before the current supply is performed,
wherein
when the fuel injection valve is detected to be opened by the precharge control, a precharge current amount when the valve is opened is held, and in a next and subsequent precharge control, precharge control at a precharge current amount equal to or larger than the precharge current amount when the valve is opened is prevented.

* * * * *